(12) United States Patent
Lopez et al.

(10) Patent No.: US 11,646,774 B2
(45) Date of Patent: May 9, 2023

(54) TRANSMITTING A SYMBOL FROM A PLURALITY OF ANTENNAS

(71) Applicant: Telefonaktiebolaget LM Ericsson (publ), Stockholm (SE)

(72) Inventors: Miguel Lopez, Solna (SE); Leif Wilhelmsson, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 52 days.

(21) Appl. No.: 17/436,829

(22) PCT Filed: Mar. 11, 2019

(86) PCT No.: PCT/EP2019/056042
§ 371 (c)(1),
(2) Date: Sep. 7, 2021

(87) PCT Pub. No.: WO2020/182290
PCT Pub. Date: Sep. 17, 2020

(65) Prior Publication Data
US 2022/0182109 A1    Jun. 9, 2022

(51) Int. Cl.
*H04B 7/04* (2017.01)
*H04B 7/0456* (2017.01)
*H04L 27/26* (2006.01)

(52) U.S. Cl.
CPC ......... *H04B 7/046* (2013.01); *H04L 27/2626* (2013.01)

(58) Field of Classification Search
CPC .......................... H04B 7/046; H04L 27/2626
See application file for complete search history.

(56) References Cited

U.S. PATENT DOCUMENTS

2011/0280188 A1  11/2011  Jeon et al.
2012/0230380 A1   9/2012  Keusgen et al.

FOREIGN PATENT DOCUMENTS

| JP | 2012518332 A | 8/2012 |
| JP | 2013510538 A | 3/2013 |
| JP | 2018509816 A | 4/2018 |

OTHER PUBLICATIONS

Unknown, Author, "Part 11: Wireless LAN Medium Access Control (MAC) and Physical Layer (PHY) Specifications", IEEE Std 802.11™—2016; IEEE Standard for Information technology—Telecommunications and information exchange between systems Local and metropolitan area networks—Specific requirements, Dec. 14, 2016, 1-3534.

*Primary Examiner* — Curtis B Odom
(74) *Attorney, Agent, or Firm* — Murphy, Bilak & Homiller, PLLC

(57) ABSTRACT

Methods and apparatus are provided for transmitting a symbol from a plurality of antennas. In one example, a method comprises transmitting simultaneously, from each antenna, the symbol multiplied by a respective element of a selected column of a matrix. The number of rows of the matrix is at least the number of antennas, the number of columns of the matrix is at least 9, and the matrix comprises or is a sub-matrix of a real Hadamard matrix of maximum excess.

26 Claims, 7 Drawing Sheets

Transmitting simultaneously, from each antenna, the symbol multiplied by a respective element of a selected column of a matrix, wherein the number of rows of the matrix is at least the number of antennas, the number of columns of the matrix is at least 9, and the matrix comprises or is a sub-matrix of a real Hadamard matrix of maximum excess — 702

Transmitting simultaneously, from each antenna, the symbol multiplied by a respective element of a selected column of a matrix, wherein the number of rows of the matrix is at least the number of antennas, the number of columns of the matrix is at least 9, and the matrix comprises or is a sub-matrix of a real Hadamard matrix of maximum excess — 702

Transmitting simultaneously, from each antenna, the symbol multiplied by a respective element of a selected row of a matrix, wherein the number of columns of the matrix is at least the number of antennas, the number of rows of the matrix is at least 9, and the matrix comprises or is a sub-matrix of a real Hadamard matrix of maximum excess — 802

|  1 | -1 | -1 |  1 | -1 |  1 | -1 |  1 |  1 |  1 |  1 |  1 |
|  1 |  1 | -1 | -1 | -1 | -1 |  1 |  1 | -1 | -1 |  1 |  1 |
|  1 |  1 |  1 |  1 | -1 |  1 | -1 | -1 | -1 | -1 | -1 |  1 |
|  1 | -1 |  1 | -1 |  1 |  1 |  1 | -1 |  1 | -1 |  1 |  1 |
|  1 |  1 | -1 |  1 |  1 |  1 |  1 | -1 | -1 |  1 |  1 | -1 |
|  1 | -1 |  1 |  1 |  1 | -1 |  1 |  1 | -1 |  1 | -1 |  1 |
|  1 |  1 | -1 | -1 |  1 | -1 | -1 | -1 |  1 |  1 | -1 |  1 |
| -1 |  1 |  1 | -1 |  1 |  1 | -1 |  1 | -1 |  1 |  1 |  1 |
|  1 |  1 |  1 | -1 | -1 |  1 |  1 |  1 |  1 |  1 | -1 | -1 |
| -1 |  1 | -1 |  1 |  1 |  1 |  1 |  1 |  1 | -1 | -1 |  1 |
|  1 |  1 |  1 |  1 |  1 | -1 | -1 |  1 |  1 | -1 |  1 | -1 |
| -1 |  1 |  1 |  1 | -1 | -1 |  1 | -1 |  1 |  1 |  1 |  1 |

```
Selecting a real Hadamard matrix — 1302
Determining a first excess of the matrix — 1304
Negating a row and a column of the matrix — 1306
Determining a second excess of the matrix — 1308
If the second excess is less than the first excess, reversing the negating step — 1310
Repeating the previous four steps until the matrix comprises a maximum excess real Hadamard matrix — 1312
```

1300

TRANSMITTING A SYMBOL FROM A PLURALITY OF ANTENNAS

TECHNICAL FIELD

Examples of the present disclosure relate to transmitting a symbol, for example a long training field (LTF), from a plurality of antennas.

BACKGROUND

Advanced antenna systems may be used to significantly enhance performance of wireless communication systems in both uplink (UL) and downlink (DL) directions. For example, advanced antennas may provide the possibility of using the spatial domain of the channel to improve reliability and/or throughput of transmissions, for example by transmitting using multiple spatial streams (also referred to as space time streams).

The 802.11-16 standard, for example, specifies a set of matrices, often called P matrices, where the rows (and columns) define a set of orthogonal vectors that are employed as orthogonal cover codes for channel and pilot estimation when utilizing more than one space time stream (e.g. un multiple-input multiple-output, MIMO, operation). Rows or columns of these P matrices may be applied to the Long Training Field (LTF) and to pilots embedded in data symbols when transmitted. The P matrices may be for example Hadamard matrices.

A real Hadamard matrix is a square matrix H of dimensions n×n whose entries consist of +1 and −1 (i.e. only real values), such that $H \cdot H^T = nI$. Here the superscript $(\cdot)^T$ denotes matrix transpose and I is the identity matrix.) It is known that the order of a real Hadamard matrix is either n=1, 2 or a multiple of 4 (i.e. n=4, 8, 12, 16, . . . ). It can be verified that the Hadamard property of a matrix is preserved by the following operations:

1) Negation of a row or column.
2) Permutation (i.e. swapping) of any two rows or columns.

Moreover, any Hadamard matrix can be transformed into a matrix whose first row and first column consist exclusively of +1's by means of these operations. A Hadamard matrix in this form is said to be normalized. If a Hadamard matrix A can be transformed into a Hadamard matrix B by successive application of the operations 1 and 2 identified above, then the two matrices A and B are said to be equivalent. Otherwise, the matrices are said to be non-equivalent. Any Hadamard matrix is equivalent to a normalized Hadamard matrix.

EHT (Extremely High Throughput) has been proposed as an enhancement of the IEEE 802.11 standard. In particular, EHT shall provide support for up to 16 space-time streams. Currently the IEEE 802.11-16 standard and its amendment 802.11ax support up to 8 space time streams. Hence, for example, there may be a need for matrices (e.g. P matrices) of orders $9 \leq n \leq 16$ to provide orthogonal cover codes for long training fields (LTFs) for up to 16 space-time streams.

The construction of real-valued P matrices for 8 or fewer space time streams is straightforward and can be done by inspection or by exhaustive computer search. However, as the dimension of the P matrix increases, exhaustive computer search becomes impractical.

SUMMARY

One aspect of the present disclosure provides a method of transmitting a symbol from a plurality of antennas. The method comprises transmitting simultaneously, from each antenna, the symbol multiplied by a respective element of a selected column of a matrix. The number of rows of the matrix is at least the number of antennas, the number of columns of the matrix is at least 9, and the matrix comprises or is a sub-matrix of a real Hadamard matrix of maximum excess.

Another aspect of the present disclosure provides a method of transmitting a symbol from a plurality of antennas. The method comprises transmitting simultaneously, from each antenna, the symbol multiplied by a respective element of a selected row of a matrix. The number of columns of the matrix is at least the number of antennas, the number of rows of the matrix is at least 9, and the matrix comprises or is a sub-matrix of a real Hadamard matrix of maximum excess.

A further aspect of the present disclosure provides method of constructing a maximum excess real Hadamard matrix. The method comprises selecting a real Hadamard matrix, determining a first excess of the matrix, negating a row and a column of the matrix, determining a second excess of the matrix, if the second excess is less than the first excess, reversing the negating step, and repeating the previous four steps until the matrix comprises a maximum excess real Hadamard matrix.

A still further aspect of the present disclosure provides apparatus for transmitting a symbol from a plurality of antennas. The apparatus comprises a processor and a memory. The memory contains instructions executable by the processor such that the apparatus is operable to transmit simultaneously, from each antenna, the symbol multiplied by a respective element of a selected column of a matrix. The number of rows of the matrix is at least the number of antennas, the number of columns of the matrix is at least 9, and the matrix comprises or is a sub-matrix of a real Hadamard matrix of maximum excess.

Another aspect of the present disclosure provides apparatus for transmitting a symbol from a plurality of antennas. The apparatus comprises a processor and a memory. The memory contains instructions executable by the processor such that the apparatus is operable to transmit simultaneously, from each antenna, the symbol multiplied by a respective element of a selected row of a matrix. The number of columns of the matrix is at least the number of antennas, the number of rows of the matrix is at least 9, and the matrix comprises or is a sub-matrix of a real Hadamard matrix of maximum excess.

An additional aspect of the present disclosure provides apparatus for transmitting a symbol from a plurality of antennas. The apparatus is configured to transmit simultaneously, from each antenna, the symbol multiplied by a respective element of a selected column of a matrix. The number of rows of the matrix is at least the number of antennas, the number of columns of the matrix is at least 9, and the matrix comprises or is a sub-matrix of a real Hadamard matrix of maximum excess.

A further aspect of the present disclosure provides apparatus for transmitting a symbol from a plurality of antennas. The apparatus is configured to transmit simultaneously, from each antenna, the symbol multiplied by a respective element of a selected row of a matrix. The number of columns of the matrix is at least the number of antennas, the number of rows of the matrix is at least 9, and the matrix comprises or is a sub-matrix of a real Hadamard matrix of maximum excess.

BRIEF DESCRIPTION OF THE DRAWINGS

For a better understanding of examples of the present disclosure, and to show more clearly how the examples may be carried into effect, reference will now be made, by way of example only, to the following drawings in which:

FIG. 1 is an example of a normalized Hadamard matrix of order n=12;

FIG. 2 is an example of a normalized Hadamard matrix of order n=16;

FIG. 3 is an example of a normalized Hadamard matrix of order n=16;

FIG. 4 is an example of a normalized Hadamard matrix of order n=16;

FIG. 5 is an example of a normalized Hadamard matrix of order n=16;

FIG. 6 is an example of a normalized Hadamard matrix of order n=16;

FIG. 7 is a flow chart of an example of a method of transmitting a symbol from a plurality of antennas;

FIG. 8 is a flow chart of an example of a method of transmitting a symbol from a plurality of antennas;

FIG. 9, which is an example of a maximum excess real Hadamard matrix of order n=12;

FIG. 10, which is an example of a maximum excess real Hadamard matrix of order n=16;

FIG. 11, which is an example of a maximum excess real Hadamard matrix of order n=16;

DETAILED DESCRIPTION

Figures 12, 13:
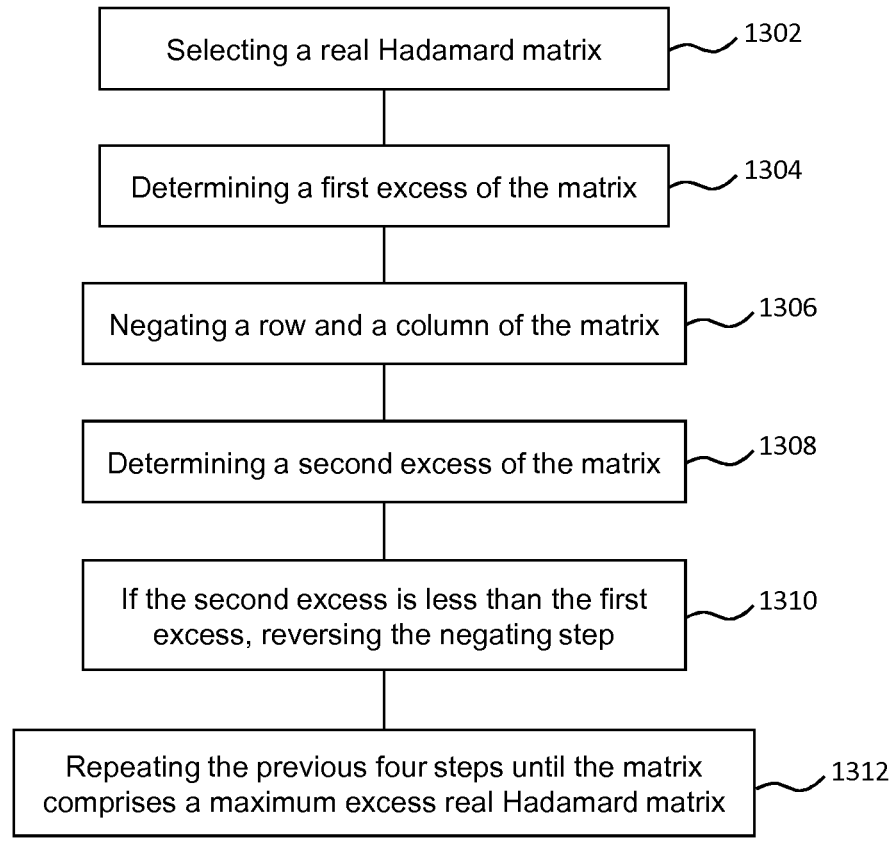
FIG. 12, which is an example of a maximum excess real Hadamard matrix of order n=16.
FIG. 13 is a flow chart of an example of a method of constructing a maximum excess real Hadamard matrix.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause processing circuitry to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Figures 1, 2:
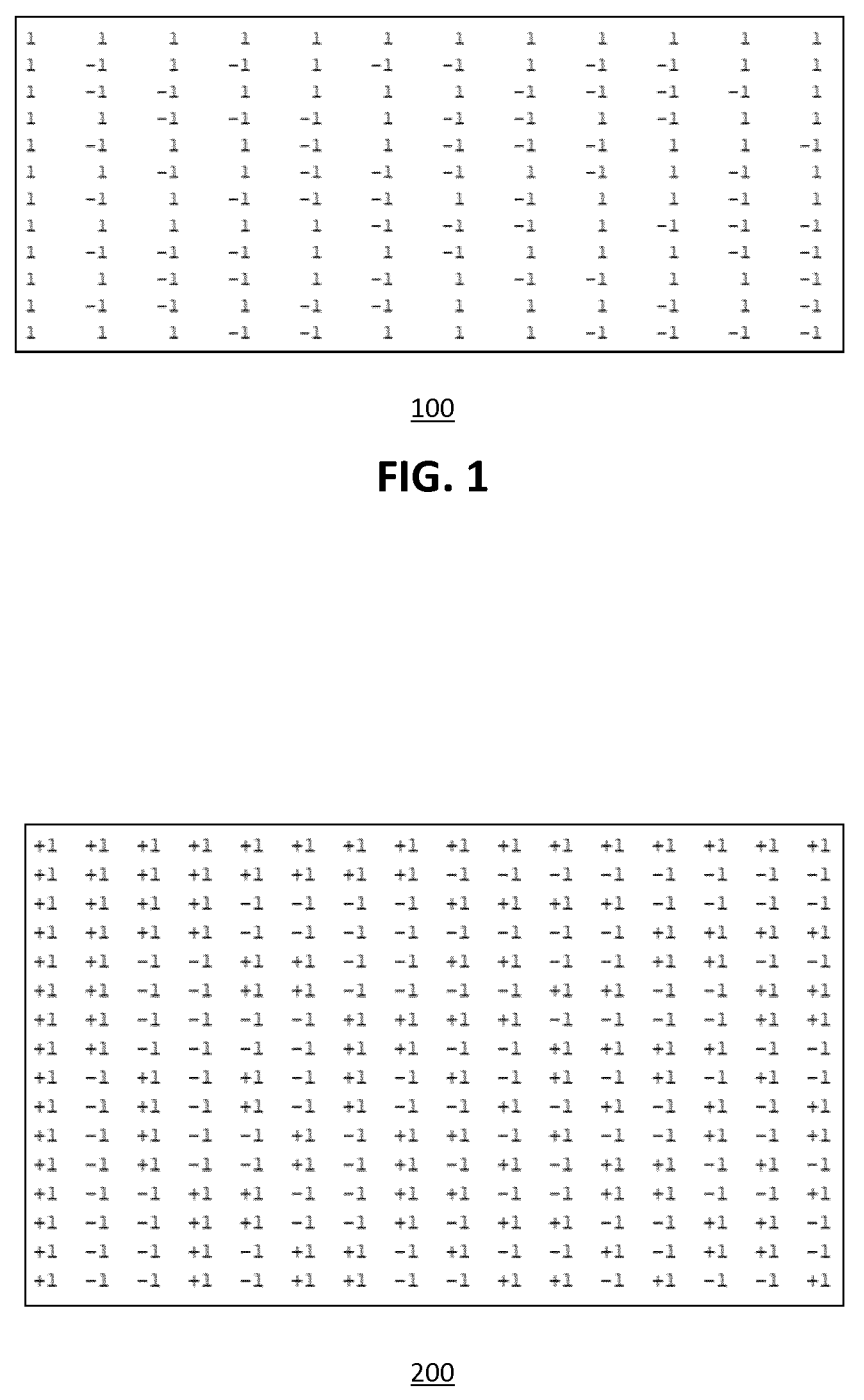
Figures 3, 4:
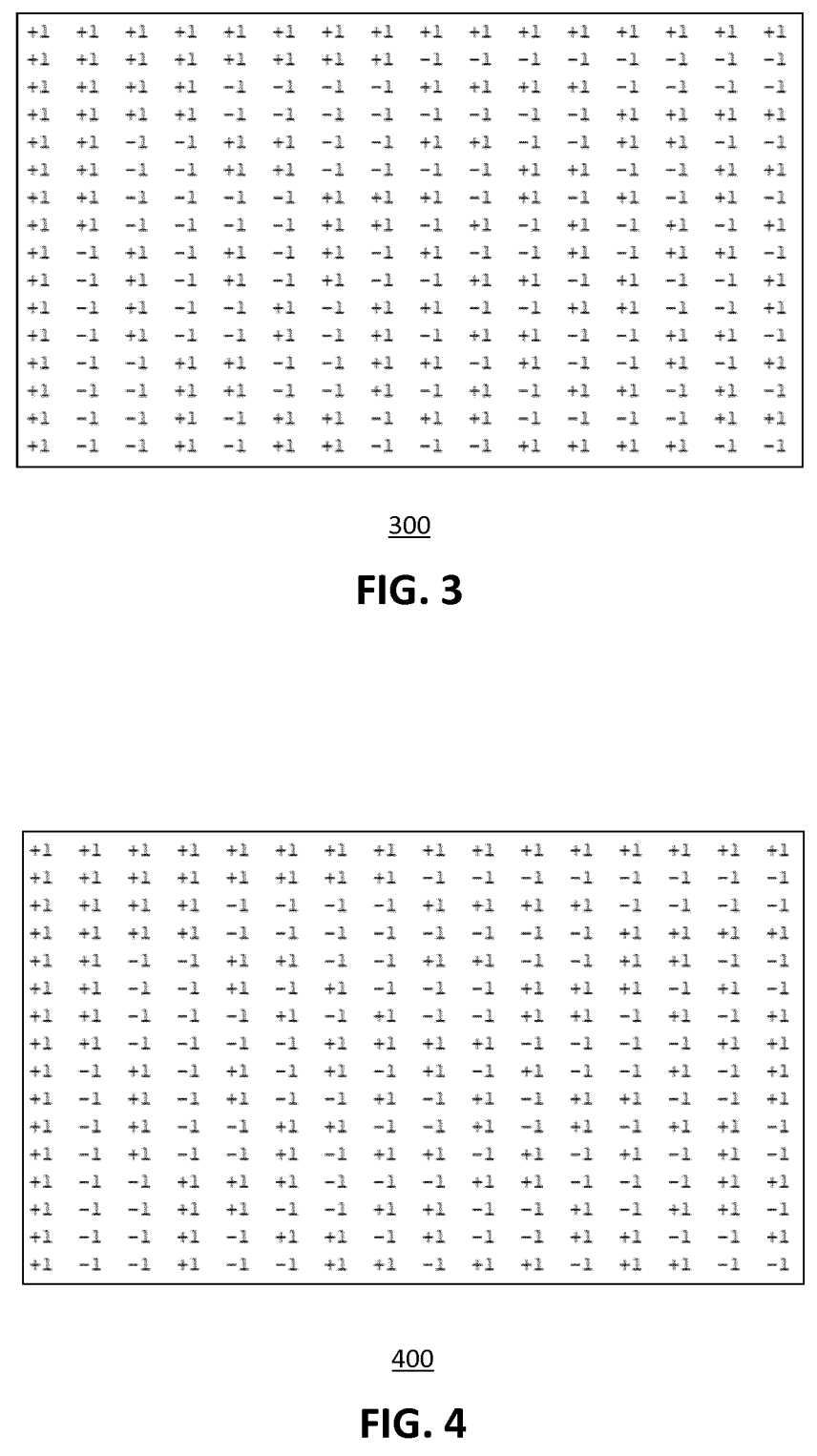
Figures 5, 6:
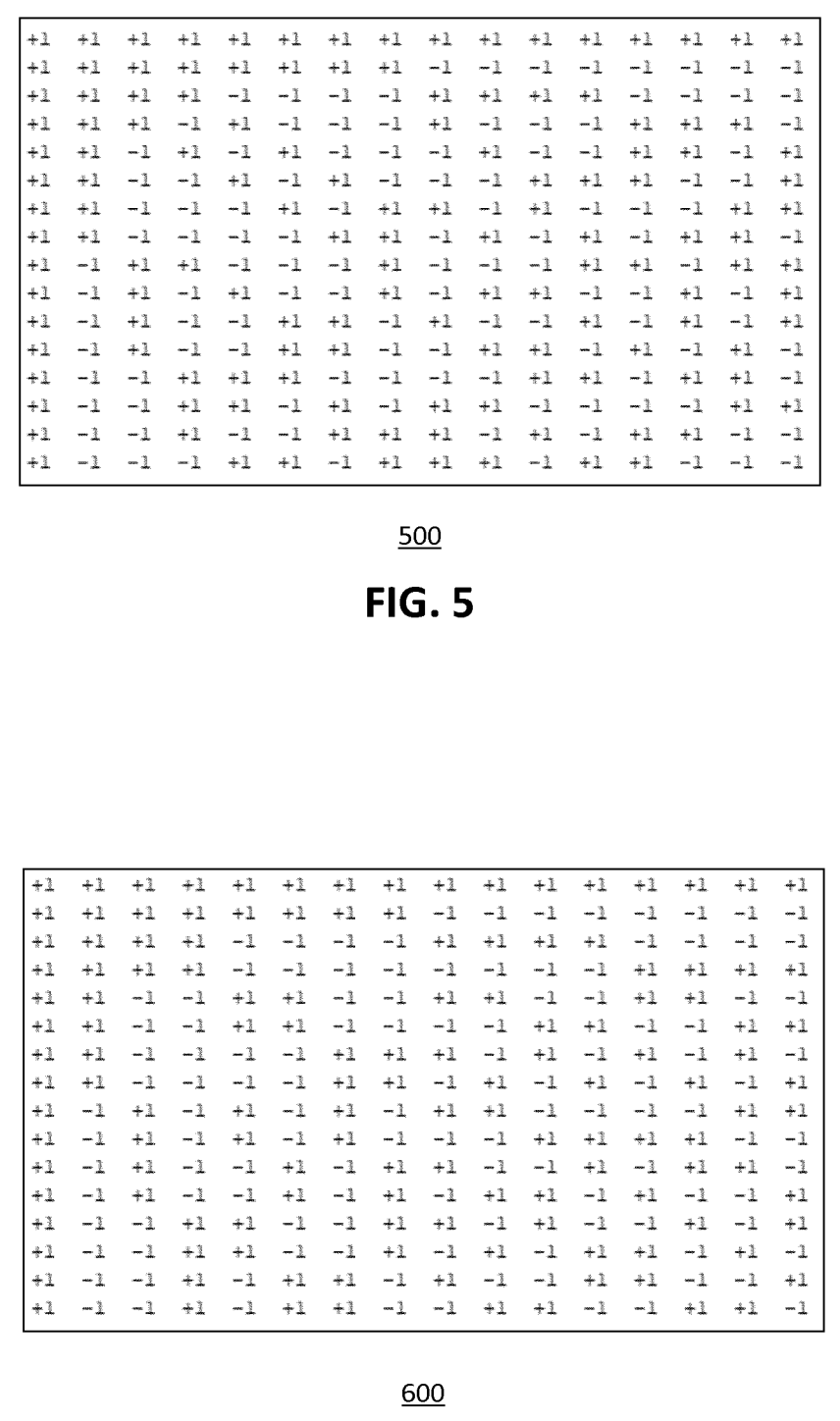

At least some embodiments of the present disclosure relate to the design of matrices (e.g. P matrices, and/or matrices the rows or columns of which may be applied to symbols such as LTF symbols) that reduce the computational complexity and/or memory requirements at the transmitter and receiver. For this reason, the following definition will be useful. The excess σ(H) of a real Hadamard matrix H is defined to be the sum of all its entries. For example, this property indicates the excess (or deficit) of entries comprising +1's respect to entries comprising −1's. The maximum possible excess of a real Hadamard matrix of order n=12 is 36. Likewise, the maximum possible excess of a real Hadamard matrix of order n=16 is 64. A real Hadamard matrix that has the maximum possible excess for a given order is referred to herein as a maximum excess Hadamard matrix. Notwithstanding row and/or column permutations, there is only one normalized Hadamard matrix 100 of order n=12, which is shown in FIG. 1. There are also exactly 5 non-equivalent normalized Hadamard matrices 200, 300, 400, 500 and 600 of order n=16, shown in FIGS. 2 to 6 respectively. However, these matrices 100-600 are not maximum excess Hadamard matrices.

Embodiments of the present disclosure propose use of matrices that may be suitable for providing orthogonal cover codes that enable support for at least 9 space-time streams. In some examples, the proposed matrices are real Hadamard matrices that have the maximum possible excess.

The matrices may for example provide orthogonal cover codes that enable support of at least 9 space-time streams, e.g. up to 16 space time streams. Since the orthogonal cover codes are defined in terms of Hadamard matrices with maximum possible excess, they consist exclusively of ±1's and possess the maximum possible number of +1's. These two properties may in some examples allow the largest possible reduction in computational complexity and/or memory usage at the transmitter when compared to using other matrices and cover codes, including real Hadamard matrices that do not have the maximum excess.

FIG. 7 is a flow chart of an example of a method 700 of transmitting a symbol from a plurality of antennas. In some examples, the symbol may comprise or include a long training field (LTF) symbol or one or more pilot symbols, and/or may comprise an OFDM symbol. The method comprises, in step 702, transmitting simultaneously, from each antenna, the symbol multiplied by a respective element of a selected column of a matrix. The number of rows of the matrix is at least the number of antennas, the number of columns of the matrix is at least 9, and the matrix comprises or is a sub-matrix of a real Hadamard matrix of maximum excess.

Thus, for example, the symbol may be transmitted and multiplied by an element from the selected column of the matrix, the element corresponding to the antenna from which the symbol is transmitted. The element may be different for each antenna, though in some examples the value of the elements may be the same (e.g. selected from ±1).

In some examples, the number of space-time streams that are to be transmitted or are being transmitted is less than the order (size, number of rows/columns) of the Hadamard matrix. For example, the Hadamard matrix may be a 16×16 matrix, whereas 15 space-time streams may be transmitted. In some examples, the matrix used to provide orthogonal cover codes for 15 space-time streams may be a 15×16 matrix. In some examples, the number of space-time streams is equal to the number of antennas.

In some examples, more than one symbol is transmitted, e.g. at least the number of space-time streams. In some examples, the number of times transmission of the symbol is repeated over time (including the first transmission) is equal to the number of columns of the matrix (e.g. 16 columns for a 16×16 Hadamard matrix). In some examples, the method 700 may comprise transmitting at least one further symbol comprising, for each further symbol, transmitting simultaneously, from each antenna, the further symbol multiplied by a respective element of a column of the matrix that is associated with the further symbol. That is, for example, as part of a training sequence, in a first time period, the symbol is transmitted and elements from a first column of the matrix are used; and for a subsequent time period, the symbol is transmitted again, and elements from a different column of the matrix are used. The symbol may in some examples be transmitted again one or more in further subsequent time periods of the training sequence using a different column of the matrix each time. Thus, for example, the selected column and each column associated with each further symbol comprise different columns of the matrix.

FIG. 8 shows an alternative example of a method 800 of transmitting a symbol from a plurality of antennas. The method 800 differs from the method 700 in that the symbol is multiplied by a respective element of a selected column, instead of a row, of the matrix. Thus the method 800 comprises, in step 802, transmitting simultaneously, from each antenna, the symbol multiplied by a respective element of a selected row of a matrix. The number of columns of the matrix is at least the number of antennas, the number of rows of the matrix is at least 9, and the matrix comprises or is a sub-matrix of a real Hadamard matrix of maximum excess. Any alternative described above with respect to the method 700 of FIG. 7 may also be applied to the method 800 of FIG. 8, except referring to a row instead of a column and a column instead of a row where appropriate.

It should be noted that actual implementations of the method 700 or 800 may or may not use specifically a row or column of a matrix. Instead, for example, calculations or operations may be performed that effectively cause transmission of symbol as if it has been multiplied by a value that would be from a matrix that comprises or is a sub-matrix of a real Hadamard matrix of maximum excess, even if other operations, vectors and/or matrices are used instead.

In some examples, the number of antennas is at least the number of space time streams, e.g. at least 9. The matrix may comprise a 12×12 or 16×16 matrix. For example, the matrix comprises a matrix M or a sub-matrix of M, wherein M comprises or is equivalent to the matrix 900 shown in FIG. 9, which is an example of a maximum excess real Hadamard matrix of order n=12. For example, embodiments that use up to 12 spatial streams, and/or transmit a symbol in up to 12 different time periods, may use the matrix 900 or an equivalent. Similarly, the Hadamard matrix may comprise the matrix 1000-1200 shown in FIGS. 10-12 respectively, which show examples of maximum excess real Hadamard matrices of order n=16. For example, these may be used in embodiments with up to 16 spatial streams, and/or transmitting a symbol in up to 16 different time periods.

Figures 10, 11:
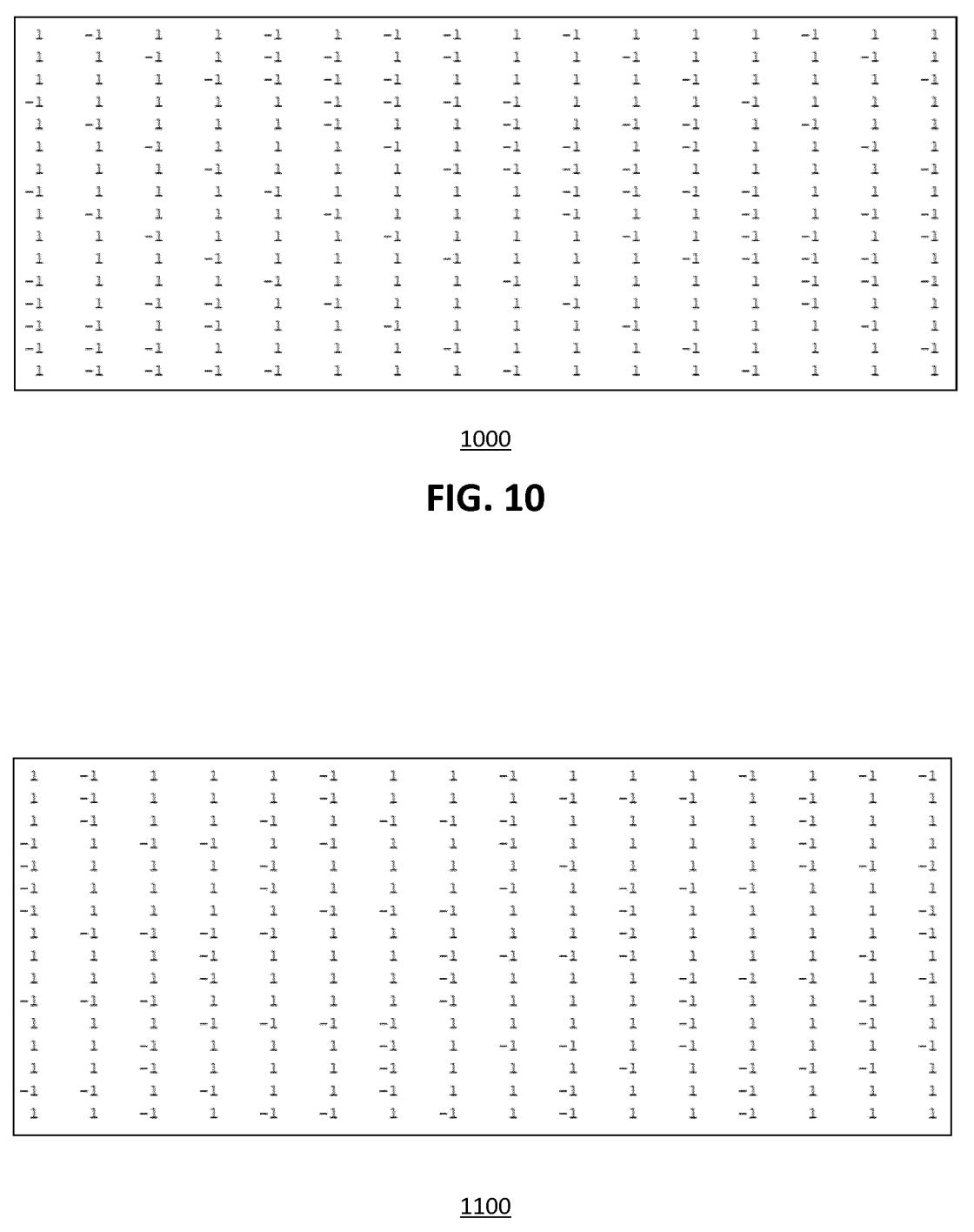

The matrix 1000 in FIG. 10 can be defined for example as M⊗M, where ⊗ denotes the Kronecker product and $$M = \begin{bmatrix} +1 & -1 & +1 & +1 \\ +1 & +1 & -1 & +1 \\ +1 & +1 & +1 & -1 \\ -1 & +1 & +1 & +1 \end{bmatrix}.$$

In some examples, where the number of space time streams is m=9,10,11, it is proposed to use a sub-matrix of a Hadamard matrix to provide orthogonal vectors to apply to a symbol (e.g. in different time periods). The matrix to use may for example be of dimension m×12 and thus may be a sub-matrix of a maximum excess Hadamard matrix of order 12. Where the number of space time streams is m=13,14,15, a sub-matrix of dimension m×16 of a maximum excess Hadamard matrix of order 16 may be used.

FIG. 13 is a flow chart of an example of a method 1300 of constructing a maximum excess real Hadamard matrix. The method 1300 comprises, in step 1302, selecting a real Hadamard matrix. This may be for example a normalized Hadamard matrix, such as those shown in FIGS. 1 to 7, or any other Hadamard matrix. The method 1300 also comprises, in step 1304, determining a first excess of the matrix, and in step 1306, negating a row and a column of the matrix. The row and column may be selected sequentially, randomly or in any other manner. In some examples, the row and column are selected such that, following a number of repetitions of step 1306, every row/column combination is negated at least once. Therefore, for example, for a 16×16 matrix, step 1306 may be repeated at least 256 times (unless a maximum excess matrix is achieved before all combinations are negated).

Next, step 1308 of the method comprises determining a second excess of the matrix, which may be different to the first excess determined in step 1304 as a result of the negation in step 1306. In step 1310, the method 1300 comprises, if the second excess is less than the first excess (or alternatively, less than or equal to the first excess), reversing the negating step. Thus, following steps 1304-1310, the excess of the matrix will not have decreased, and may have increased or remained the same. Finally, step 1312 of the method 1300 comprises repeating the previous four steps (i.e. steps 1304-1310) until the matrix comprises a maximum excess real Hadamard matrix. In some examples of the method 700 or 800, the matrix is constructed according to the method 1300.

FIG. 1400 shows an example of an apparatus 1400 for transmitting a symbol from a plurality of antennas. In some examples, the apparatus 1400 may be configured to perform the method 700 described above with reference to FIG. 7, or any of the other examples described herein.

The apparatus 1400 comprises a processor 1402 and a memory 1404 in communication with the processor 1402. The memory 1404 contains instructions executable by the processor 1402. In one embodiment, the memory 1404 containing instructions executable by the processor 1402 such that the apparatus 1400 is operable to transmit simultaneously, from each antenna, the symbol multiplied by a respective element of a selected column of a matrix. The number of rows of the matrix is at least the number of antennas, the number of columns of the matrix is at least 9, and the matrix comprises or is a sub-matrix of a real Hadamard matrix of maximum excess.

FIG. 1500 shows an example of an apparatus 1500 for transmitting a symbol from a plurality of antennas. In some examples, the apparatus 1500 may be configured to perform the method 800 described above with reference to FIG. 8, or any of the other examples described herein.

The apparatus 1500 comprises a processor 1502 and a memory 1504 in communication with the processor 1502. The memory 1504 contains instructions executable by the processor 1502. In one embodiment, the memory 1504 containing instructions executable by the processor 1502 such that the apparatus 1500 is operable to transmit simultaneously, from each antenna, the symbol multiplied by a respective element of a selected row of a matrix. The number of columns of the matrix is at least the number of antennas, the number of rows of the matrix is at least 9, and the matrix comprises or is a sub-matrix of a real Hadamard matrix of maximum excess.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of transmitting a symbol from a plurality of antennas, the method comprising:
   transmitting simultaneously, from each antenna, the symbol multiplied by a respective element of a selected column of a matrix;
   wherein the number of rows of the matrix is at least the number of antennas, the number of columns of the matrix is at least 9, and the matrix comprises or is a sub-matrix of a real Hadamard matrix of maximum excess.

2. The method of claim 1, further comprising:
   transmitting at least one further symbol, wherein transmitting the at least one further symbol comprises, for each further symbol, transmitting simultaneously, from each antenna, the further symbol multiplied by a respective element of a column of the matrix that is associated with the further symbol.

3. The method of claim 2, wherein the selected column and each column associated with each further symbol comprise different columns of the matrix.

4. The method of claim 2, wherein the symbol and the at least one further symbol comprise at least 9 OFDM symbols.

5. The method of claim 1, wherein the number of antennas is at least 9.

6. The method of claim 1, wherein the matrix comprises an 8×8, 12×12 or 16×16 matrix.

7. The method of claim 1, wherein the matrix comprises a matrix M or a sub-matrix of M, wherein M comprises or is equivalent to:

$$\begin{pmatrix} 1 & -1 & -1 & 1 & -1 & 1 & -1 & 1 & 1 & 1 & 1 & 1 \\ 1 & 1 & -1 & -1 & -1 & -1 & 1 & 1 & -1 & -1 & 1 & 1 \\ 1 & 1 & 1 & 1 & -1 & 1 & -1 & -1 & -1 & -1 & -1 & 1 \\ 1 & -1 & 1 & -1 & 1 & 1 & 1 & -1 & 1 & -1 & 1 & 1 \\ 1 & 1 & -1 & 1 & 1 & 1 & 1 & -1 & -1 & 1 & 1 & -1 \\ 1 & -1 & 1 & 1 & 1 & -1 & 1 & -1 & 1 & -1 & 1 & 1 \\ 1 & 1 & -1 & -1 & 1 & -1 & -1 & -1 & 1 & 1 & -1 & 1 \\ -1 & 1 & 1 & -1 & 1 & 1 & -1 & 1 & -1 & 1 & 1 & 1 \\ 1 & 1 & 1 & -1 & -1 & 1 & 1 & 1 & 1 & 1 & -1 & -1 \\ -1 & 1 & -1 & 1 & 1 & 1 & 1 & 1 & 1 & -1 & -1 & 1 \\ 1 & 1 & 1 & 1 & 1 & -1 & -1 & 1 & 1 & -1 & 1 & -1 \\ -1 & 1 & 1 & 1 & -1 & -1 & 1 & -1 & 1 & 1 & 1 & 1 \end{pmatrix}$$

8. The method of claim 1, wherein the matrix comprises a matrix M or a sub-matrix of M, wherein M comprises or is equivalent to:

$$\begin{pmatrix} 1 & -1 & 1 & 1 & -1 & 1 & -1 & -1 & 1 & -1 & 1 & 1 & 1 & -1 & 1 & 1 \\ 1 & 1 & -1 & 1 & -1 & -1 & 1 & -1 & 1 & 1 & -1 & 1 & 1 & 1 & -1 & 1 \\ 1 & 1 & 1 & -1 & -1 & -1 & -1 & 1 & 1 & 1 & 1 & -1 & 1 & 1 & 1 & -1 \\ -1 & 1 & 1 & 1 & 1 & -1 & -1 & -1 & -1 & 1 & 1 & 1 & -1 & 1 & 1 & 1 \\ 1 & -1 & 1 & 1 & 1 & -1 & 1 & 1 & -1 & 1 & -1 & -1 & 1 & -1 & 1 & 1 \\ 1 & 1 & -1 & 1 & 1 & 1 & -1 & -1 & 1 & -1 & 1 & -1 & -1 & 1 & -1 & 1 \\ 1 & 1 & 1 & -1 & 1 & 1 & 1 & -1 & -1 & -1 & -1 & 1 & 1 & 1 & 1 & -1 \\ -1 & 1 & 1 & 1 & -1 & 1 & 1 & 1 & 1 & -1 & -1 & -1 & -1 & 1 & 1 & 1 \\ 1 & -1 & 1 & 1 & 1 & -1 & 1 & 1 & -1 & 1 & 1 & -1 & 1 & -1 & -1 & 1 \\ 1 & 1 & -1 & 1 & 1 & 1 & -1 & 1 & 1 & -1 & 1 & -1 & -1 & 1 & -1 & 1 \\ 1 & 1 & 1 & -1 & 1 & 1 & 1 & -1 & 1 & 1 & -1 & -1 & 1 & -1 & 1 & -1 \\ -1 & 1 & 1 & 1 & -1 & 1 & 1 & 1 & -1 & 1 & 1 & 1 & -1 & -1 & -1 \\ -1 & 1 & -1 & -1 & 1 & -1 & 1 & 1 & 1 & -1 & 1 & 1 & 1 & -1 & 1 & 1 \\ -1 & -1 & 1 & -1 & 1 & 1 & -1 & 1 & 1 & 1 & -1 & 1 & 1 & 1 & -1 & 1 \\ -1 & -1 & -1 & 1 & 1 & 1 & 1 & -1 & 1 & 1 & 1 & -1 & 1 & 1 & 1 & -1 \\ 1 & -1 & -1 & -1 & -1 & 1 & 1 & 1 & -1 & 1 & 1 & 1 & -1 & 1 & 1 & 1 \end{pmatrix}$$

9. The method of claim 1, wherein the matrix comprises a matrix M or a sub-matrix of M, wherein M comprises or is equivalent to:

$$\begin{pmatrix} 1 & -1 & 1 & 1 & 1 & -1 & 1 & 1 & -1 & 1 & 1 & 1 & -1 & 1 & -1 & -1 \\ 1 & -1 & 1 & 1 & 1 & -1 & 1 & 1 & 1 & -1 & -1 & -1 & 1 & -1 & 1 & 1 \\ 1 & -1 & 1 & 1 & -1 & 1 & -1 & -1 & -1 & 1 & 1 & 1 & 1 & -1 & 1 & 1 \\ -1 & 1 & -1 & -1 & 1 & -1 & 1 & 1 & -1 & 1 & 1 & 1 & 1 & -1 & 1 & 1 \\ -1 & 1 & 1 & 1 & -1 & 1 & 1 & 1 & 1 & -1 & 1 & 1 & 1 & -1 & -1 & -1 \\ -1 & 1 & 1 & 1 & -1 & 1 & 1 & -1 & 1 & -1 & -1 & -1 & 1 & 1 & 1 \\ -1 & 1 & 1 & 1 & 1 & -1 & -1 & -1 & 1 & -1 & 1 & 1 & 1 & 1 & 1 & -1 \\ 1 & -1 & -1 & -1 & -1 & 1 & 1 & 1 & 1 & -1 & 1 & 1 & 1 & 1 & 1 & -1 \\ 1 & 1 & 1 & -1 & 1 & 1 & 1 & -1 & -1 & -1 & -1 & 1 & 1 & 1 & -1 & 1 \\ 1 & 1 & 1 & -1 & 1 & 1 & 1 & -1 & 1 & 1 & -1 & -1 & -1 & 1 & -1 \\ -1 & -1 & -1 & 1 & 1 & 1 & 1 & -1 & 1 & 1 & -1 & 1 & 1 & 1 & 1 & 1 \\ 1 & 1 & 1 & -1 & -1 & -1 & -1 & 1 & 1 & 1 & -1 & 1 & 1 & -1 & 1 & 1 \\ 1 & 1 & -1 & 1 & 1 & 1 & -1 & 1 & -1 & 1 & -1 & 1 & 1 & 1 & -1 \\ 1 & 1 & -1 & 1 & 1 & 1 & 1 & -1 & 1 & -1 & 1 & -1 & -1 & 1 & 1 \\ -1 & -1 & 1 & -1 & 1 & 1 & -1 & 1 & 1 & -1 & 1 & -1 & 1 & 1 & 1 & 1 \\ 1 & 1 & -1 & 1 & -1 & -1 & 1 & -1 & 1 & -1 & 1 & 1 & -1 & 1 & 1 & 1 \end{pmatrix}$$

10. The method of claim 1, wherein the matrix comprises a matrix M or a sub-matrix of M, wherein M comprises or is equivalent to:

$$\begin{pmatrix} 1 & -1 & 1 & 1 & -1 & 1 & 1 & 1 & -1 & 1 & -1 & -1 & 1 & -1 & 1 & 1 \\ 1 & -1 & 1 & 1 & -1 & 1 & 1 & 1 & 1 & -1 & 1 & 1 & -1 & 1 & -1 & -1 \\ -1 & 1 & -1 & -1 & -1 & 1 & 1 & 1 & 1 & -1 & 1 & 1 & 1 & -1 & 1 & 1 \\ 1 & -1 & 1 & 1 & 1 & -1 & -1 & -1 & 1 & -1 & 1 & 1 & 1 & -1 & 1 & 1 \\ -1 & 1 & 1 & 1 & 1 & -1 & 1 & 1 & -1 & -1 & -1 & -1 & 1 & 1 & 1 \\ -1 & 1 & 1 & 1 & 1 & -1 & 1 & 1 & -1 & 1 & 1 & -1 & -1 & -1 & 1 \\ -1 & 1 & 1 & 1 & -1 & 1 & -1 & 1 & 1 & 1 & 1 & -1 & -1 & -1 & 1 & -1 \\ 1 & -1 & -1 & -1 & 1 & -1 & 1 & 1 & 1 & 1 & 1 & -1 & 1 & 1 & 1 \\ -1 & -1 & -1 & 1 & 1 & 1 & -1 & 1 & 1 & 1 & -1 & 1 & 1 & 1 & 1 & -1 \\ 1 & 1 & 1 & -1 & -1 & -1 & -1 & 1 & 1 & 1 & -1 & 1 & 1 & -1 & 1 & 1 \\ 1 & 1 & 1 & -1 & 1 & 1 & -1 & 1 & 1 & -1 & -1 & -1 & 1 & -1 \\ 1 & 1 & 1 & -1 & 1 & 1 & 1 & -1 & -1 & -1 & 1 & 1 & 1 & -1 \\ 1 & 1 & -1 & 1 & -1 & 1 & -1 & -1 & 1 & 1 & -1 & 1 & 1 & 1 \\ -1 & -1 & -1 & 1 & 1 & 1 & 1 & -1 & 1 & 1 & 1 & 1 & -1 & 1 \\ 1 & -1 & 1 & 1 & 1 & -1 & -1 & -1 & 1 & -1 & 1 & -1 & 1 & 1 \\ 1 & 1 & -1 & 1 & 1 & 1 & 1 & -1 & 1 & 1 & -1 & -1 & -1 \end{pmatrix}$$

11. The method of claim 1, wherein the symbol comprises an OFDM symbol.

12. The method of claim 1, wherein the symbol comprises a long training field (LTF) symbol.

13. A method of transmitting a symbol from a plurality of antennas, the method comprising:
   transmitting simultaneously, from each antenna, the symbol multiplied by a respective element of a selected row of a matrix;
   wherein the number of columns of the matrix is at least the number of antennas, the number of rows of the matrix is at least 9, and the matrix comprises or is a sub-matrix of a real Hadamard matrix of maximum excess.

14. The method of claim 13, further comprising:
   transmitting at least one further symbol, wherein transmitting the at least one further symbol comprises, for each further symbol, transmitting simultaneously, from each antenna, the further symbol multiplied by a respective element of a row of the matrix that is associated with the further symbol.

15. The method of claim 14, wherein the selected row and each row associated with each further symbol comprise different rows of the matrix.

16. An apparatus for transmitting a symbol from a plurality of antennas, the apparatus comprising a processor and a memory, the memory containing instructions executable by the processor such that the apparatus is operable to:
   transmit simultaneously, from each antenna, the symbol multiplied by a respective element of a selected column of a matrix;
   wherein the number of rows of the matrix is at least the number of antennas, the number of columns of the matrix is at least 9, and the matrix comprises or is a sub-matrix of a real Hadamard matrix of maximum excess.

17. The apparatus of claim 16, wherein the memory contains instructions executable by the processor such that the apparatus is operable to:
   transmit at least one further symbol, such that, for each further symbol, the further symbol is transmitted simultaneously, from each antenna, the further symbol multiplied by a respective element of a column of the matrix that is associated with the further symbol.

18. The apparatus of claim 17, wherein the selected column and each column associated with each further symbol comprise different columns of the matrix.

19. The apparatus of claim 16, wherein the matrix comprises a matrix M or a sub-matrix of M, wherein M comprises or is equivalent to:

$$\begin{bmatrix}
1 & -1 & -1 & 1 & -1 & 1 & -1 & 1 & 1 & 1 & 1 & 1 \\
1 & 1 & -1 & -1 & -1 & -1 & 1 & 1 & -1 & -1 & 1 & 1 \\
1 & 1 & 1 & 1 & -1 & 1 & -1 & -1 & -1 & -1 & -1 & 1 \\
1 & -1 & 1 & -1 & 1 & 1 & 1 & -1 & 1 & -1 & 1 & 1 \\
1 & 1 & -1 & 1 & 1 & 1 & -1 & -1 & 1 & 1 & 1 & -1 \\
1 & -1 & 1 & 1 & -1 & 1 & 1 & -1 & 1 & -1 & 1 \\
1 & 1 & -1 & -1 & 1 & -1 & -1 & -1 & 1 & 1 & -1 & 1 \\
-1 & 1 & 1 & -1 & 1 & 1 & -1 & 1 & -1 & 1 & 1 & 1 \\
1 & 1 & 1 & -1 & -1 & 1 & 1 & 1 & 1 & 1 & -1 & -1 \\
-1 & 1 & -1 & 1 & 1 & 1 & 1 & 1 & 1 & -1 & -1 & 1 \\
1 & 1 & 1 & 1 & 1 & -1 & -1 & 1 & 1 & -1 & 1 & -1 \\
-1 & 1 & 1 & 1 & -1 & -1 & 1 & -1 & 1 & 1 & 1 & 1
\end{bmatrix}$$

20. The apparatus of claim 16, wherein the matrix comprises a matrix M or a sub-matrix of M, wherein M comprises or is equivalent to:

$$\begin{bmatrix}
1 & -1 & 1 & 1 & -1 & 1 & -1 & -1 & 1 & -1 & 1 & 1 & 1 & -1 & 1 & 1 \\
1 & 1 & -1 & 1 & -1 & -1 & 1 & -1 & 1 & 1 & -1 & 1 & 1 & 1 & -1 & 1 \\
1 & 1 & 1 & -1 & -1 & -1 & -1 & 1 & 1 & 1 & 1 & -1 & 1 & 1 & 1 & -1 \\
-1 & 1 & 1 & 1 & 1 & -1 & -1 & -1 & -1 & 1 & 1 & 1 & -1 & 1 & 1 & 1 \\
1 & -1 & 1 & 1 & 1 & -1 & 1 & 1 & -1 & 1 & -1 & -1 & 1 & -1 & 1 & 1 \\
1 & 1 & -1 & 1 & 1 & 1 & -1 & 1 & -1 & -1 & 1 & -1 & 1 & 1 & -1 & 1 \\
1 & 1 & 1 & -1 & 1 & 1 & 1 & -1 & -1 & -1 & -1 & 1 & 1 & 1 & 1 & -1 \\
-1 & 1 & 1 & 1 & -1 & 1 & 1 & 1 & 1 & -1 & -1 & -1 & 1 & 1 & 1 \\
1 & -1 & 1 & 1 & 1 & -1 & 1 & 1 & 1 & -1 & 1 & 1 & -1 & 1 & -1 & -1 \\
1 & 1 & -1 & 1 & 1 & 1 & -1 & 1 & 1 & 1 & -1 & 1 & -1 & -1 & 1 & -1 \\
1 & 1 & 1 & -1 & 1 & 1 & 1 & -1 & 1 & 1 & 1 & -1 & -1 & -1 & -1 & 1 \\
-1 & 1 & 1 & 1 & -1 & 1 & 1 & 1 & -1 & 1 & 1 & 1 & 1 & -1 & -1 & -1 \\
-1 & 1 & -1 & -1 & 1 & -1 & 1 & 1 & 1 & -1 & 1 & 1 & 1 & -1 & 1 & 1 \\
-1 & -1 & 1 & -1 & 1 & 1 & -1 & 1 & 1 & 1 & -1 & 1 & 1 & 1 & -1 & 1 \\
-1 & -1 & -1 & 1 & 1 & 1 & 1 & -1 & 1 & 1 & 1 & -1 & 1 & 1 & 1 & -1 \\
1 & -1 & -1 & -1 & -1 & 1 & 1 & 1 & -1 & 1 & 1 & 1 & -1 & 1 & 1 & 1
\end{bmatrix}$$

21. The apparatus of claim 16, wherein the matrix comprises a matrix M or a sub-matrix of M, wherein M comprises or is equivalent to:

$$\begin{bmatrix}
1 & -1 & 1 & 1 & 1 & -1 & 1 & 1 & -1 & 1 & 1 & 1 & -1 & 1 & -1 & -1 \\
1 & -1 & 1 & 1 & 1 & -1 & 1 & 1 & 1 & -1 & -1 & -1 & 1 & -1 & 1 & 1 \\
1 & -1 & 1 & 1 & -1 & 1 & -1 & -1 & -1 & 1 & 1 & 1 & 1 & -1 & 1 & 1 \\
-1 & 1 & -1 & -1 & 1 & -1 & 1 & 1 & -1 & 1 & 1 & 1 & 1 & -1 & 1 & 1 \\
-1 & 1 & 1 & 1 & -1 & 1 & 1 & 1 & 1 & -1 & 1 & 1 & 1 & -1 & -1 & -1 \\
-1 & 1 & 1 & 1 & -1 & 1 & 1 & 1 & -1 & 1 & -1 & -1 & -1 & 1 & 1 & 1 \\
-1 & 1 & 1 & 1 & 1 & -1 & -1 & -1 & 1 & 1 & -1 & 1 & 1 & 1 & 1 & -1 \\
1 & -1 & -1 & -1 & -1 & 1 & 1 & 1 & 1 & 1 & -1 & 1 & 1 & 1 & 1 & -1 \\
1 & 1 & 1 & -1 & 1 & 1 & 1 & -1 & -1 & -1 & -1 & 1 & 1 & 1 & -1 & 1 \\
1 & 1 & 1 & -1 & 1 & 1 & -1 & 1 & 1 & 1 & -1 & -1 & -1 & 1 & -1 \\
-1 & -1 & -1 & 1 & 1 & 1 & -1 & 1 & 1 & 1 & -1 & 1 & 1 & -1 & 1 \\
1 & 1 & 1 & -1 & -1 & -1 & -1 & 1 & 1 & 1 & -1 & 1 & 1 & -1 & 1 \\
1 & 1 & -1 & 1 & 1 & -1 & 1 & -1 & -1 & 1 & -1 & 1 & 1 & 1 & -1 \\
1 & 1 & -1 & 1 & 1 & 1 & 1 & 1 & -1 & 1 & 1 & -1 & -1 & -1 & 1 \\
-1 & -1 & 1 & -1 & 1 & 1 & -1 & 1 & 1 & -1 & 1 & 1 & 1 & -1 & 1 & 1 \\
1 & 1 & -1 & 1 & -1 & -1 & 1 & -1 & 1 & -1 & 1 & 1 & -1 & 1 & 1 & 1
\end{bmatrix}.$$

22. The apparatus of claim 16, wherein the matrix comprises a matrix M or a sub-matrix of M, wherein M comprises or is equivalent to:

$$\begin{matrix}
1 & -1 & 1 & 1 & -1 & 1 & 1 & 1 & -1 & 1 & -1 & -1 & 1 & -1 & 1 & 1 \\
1 & -1 & 1 & 1 & -1 & 1 & 1 & 1 & 1 & -1 & 1 & 1 & -1 & 1 & -1 & -1 \\
-1 & 1 & -1 & -1 & -1 & 1 & 1 & 1 & 1 & -1 & 1 & 1 & 1 & -1 & 1 & 1 \\
1 & -1 & 1 & 1 & 1 & -1 & -1 & -1 & 1 & -1 & 1 & 1 & 1 & -1 & 1 & 1 \\
-1 & 1 & 1 & 1 & 1 & -1 & 1 & 1 & 1 & -1 & -1 & -1 & -1 & 1 & 1 & 1 \\
-1 & 1 & 1 & 1 & 1 & 1 & -1 & 1 & -1 & 1 & 1 & 1 & -1 & -1 & -1 & 1 \\
-1 & 1 & 1 & 1 & -1 & -1 & 1 & -1 & -1 & 1 & 1 & 1 & 1 & 1 & 1 & -1 \\
1 & -1 & -1 & -1 & 1 & -1 & 1 & 1 & -1 & 1 & 1 & 1 & -1 & 1 & 1 & 1 \\
-1 & -1 & -1 & 1 & 1 & 1 & -1 & 1 & 1 & 1 & 1 & -1 & 1 & 1 & 1 & -1 \\
1 & 1 & 1 & -1 & -1 & -1 & -1 & 1 & 1 & 1 & 1 & -1 & 1 & 1 & -1 & 1 \\
1 & 1 & 1 & -1 & 1 & 1 & 1 & -1 & 1 & 1 & 1 & -1 & -1 & -1 & 1 & -1 \\
1 & 1 & 1 & -1 & 1 & 1 & -1 & 1 & -1 & -1 & -1 & 1 & 1 & 1 & 1 & -1 \\
1 & 1 & -1 & 1 & -1 & 1 & -1 & -1 & 1 & 1 & -1 & 1 & -1 & 1 & 1 & 1 \\
-1 & -1 & 1 & -1 & 1 & 1 & 1 & -1 & 1 & 1 & -1 & 1 & 1 & 1 & -1 & 1 \\
1 & 1 & -1 & 1 & 1 & 1 & 1 & -1 & -1 & -1 & 1 & -1 & 1 & 1 & -1 & 1 \\
1 & 1 & -1 & 1 & 1 & -1 & 1 & 1 & 1 & 1 & -1 & 1 & 1 & -1 & -1 & -1.
\end{matrix}$$

23. The apparatus of claim 16, wherein the symbol comprises a long training field (LTF) symbol.

24. An apparatus for transmitting a symbol from a plurality of antennas, the apparatus comprising a processor and a memory, the memory containing instructions executable by the processor such that the apparatus is operable to:
- transmit simultaneously, from each antenna, the symbol multiplied by a respective element of a selected row of a matrix;
- wherein the number of columns of the matrix is at least the number of antennas, the number of rows of the matrix is at least 9, and the matrix comprises or is a sub-matrix of a real Hadamard matrix of maximum excess.

25. The apparatus of claim 24, wherein the memory contains instructions executable by the processor such that the apparatus is operable to:
- transmit at least one further symbol comprising such that, for each further symbol, the further symbol is transmitted simultaneously, from each antenna, the further symbol multiplied by a respective element of a row of the matrix that is associated with the further symbol.

26. The apparatus of claim 25, wherein the selected row and each row associated with each further symbol comprise different rows of the matrix.

\* \* \* \* \*

UNITED STATES PATENT AND TRADEMARK OFFICE
CERTIFICATE OF CORRECTION

PATENT NO. : 11,646,774 B2
APPLICATION NO. : 17/436829
DATED : May 9, 2023
INVENTOR(S) : Lopez et al.

Page 1 of 1

It is certified that error appears in the above-identified patent and that said Letters Patent is hereby corrected as shown below:

In the Specification

In Column 1, Line 32, delete "matrix.)" and insert -- matrix. --, therefor.

In Column 3, Line 42, delete "obscure" and insert -- to obscure --, therefor.

In Column 4, Line 7, delete "respect" and insert -- with respect --, therefor.

Figure 14:
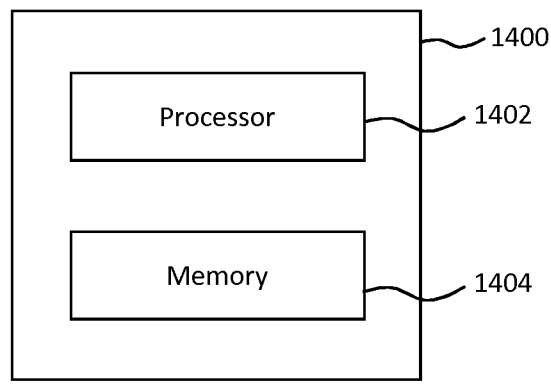
FIG. 14 shows an example of apparatus for transmitting a symbol from a plurality of antennas.

In Column 6, Line 38, delete "FIG. 1400" and insert -- FIG. 14 --, therefor.

Figure 15:
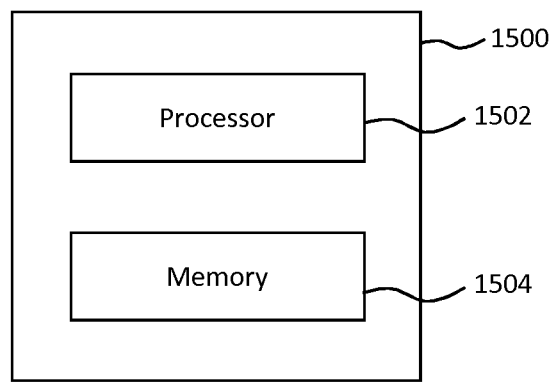
FIG. 15 shows an example of apparatus for transmitting a symbol from a plurality of antennas.

In Column 6, Line 55, delete "FIG. 1500" and insert -- FIG. 15 --, therefor.

Signed and Sealed this
Tenth Day of October, 2023

Katherine Kelly Vidal
*Director of the United States Patent and Trademark Office*